(12) United States Patent
Chae et al.

(10) Patent No.: US 11,970,184 B2
(45) Date of Patent: Apr. 30, 2024

(54) DRIVING APPARATUS AND DRIVING CONTROLLING METHOD

(71) Applicant: HANWHA AEROSPACE CO., LTD., Changwon-si (KR)

(72) Inventors: Hee Seo Chae, Changwon-si (KR); Jae Chan Park, Changwon-si (KR)

(73) Assignee: HANWHA AEROSPACE CO., LTD., Changwon-si (KR)

( * ) Notice: Subject to any disclaimer, the term of this patent is extended or adjusted under 35 U.S.C. 154(b) by 272 days.

(21) Appl. No.: 17/244,177

(22) Filed: Apr. 29, 2021

(65) Prior Publication Data

US 2022/0234608 A1 Jul. 28, 2022

(30) Foreign Application Priority Data

Jan. 28, 2021 (KR) .................. 10-2021-0012213

(51) Int. Cl.
*B60W 60/00* (2020.01)
*G06V 20/58* (2022.01)

(52) U.S. Cl.
CPC .......... *B60W 60/001* (2020.02); *G06V 20/58* (2022.01); *B60W 2420/403* (2013.01); *B60W 2420/52* (2013.01); *B60W 2552/15* (2020.02)

(58) Field of Classification Search
CPC ......... B60W 60/001; B60W 2420/403; B60W 2420/52; B60W 2552/15; B60W 40/076; B60W 30/08; G06V 20/58; G06V 20/56; G01S 17/86; G01S 17/89; G01S 17/931; B60R 21/0134; H04N 23/57

See application file for complete search history.

(56) References Cited

U.S. PATENT DOCUMENTS

| | | | | |
|---|---|---|---|---|
| 2018/0373941 | A1* | 12/2018 | Kwant | G08G 1/0145 |
| 2020/0369293 | A1* | 11/2020 | Jeon | B60W 40/08 |
| 2021/0224616 | A1* | 7/2021 | Kim | G06V 20/588 |

FOREIGN PATENT DOCUMENTS

| | | | |
|---|---|---|---|
| JP | 2005-300294 A | 10/2005 | |
| JP | 2005300294 A | * 10/2005 | |
| JP | 2009-139325 A | 6/2009 | |
| JP | 5760720 B2 | 8/2015 | |
| WO | WO-2015173005 A1 | * 11/2015 | B60W 30/06 |

* cited by examiner

*Primary Examiner* — Ig T An
(74) *Attorney, Agent, or Firm* — Sughrue Mion, PLLC

(57) ABSTRACT

Provided is a driving apparatus including a body, a surroundings detection unit detecting surroundings of the body, the surrounding detection unit including a light detection and ranging (LIDAR) device and a camera, and at least one processor configured to control the driving of the body based on a detection result from the surroundings detection unit, wherein the at least one processor is further configured to detect a ramp and flat ground that are present on a driving path based on an image obtained by the camera, and determine the detected ramp or the detected flat ground from a detection result from the LIDAR device as a non-obstacle.

15 Claims, 26 Drawing Sheets

DRIVING APPARATUS AND DRIVING CONTROLLING METHOD

CROSS-REFERENCE TO THE RELATED APPLICATION

This application claims priority to Korean Patent Application No. 10-2021-0012213, filed on Jan. 28, 2021, the entirety of which is incorporated herein by reference.

BACKGROUND

1. Field

Example embodiments of the present disclosure relate to a driving apparatus and a driving controlling method, and more particularly, to a driving apparatus and a driving controlling method, which are capable of enabling driving without recognizing flat ground viewed from a ramp or a ramp viewed from flat ground as an obstacle.

2. Description of Related Art

An unmanned autonomous vehicle can perform operations while moving around in various areas. For autonomous driving, the unmanned autonomous vehicle may be provided with sensing devices for sensing its surroundings and may move along a driving path that can avoid any obstacle based on the results of the sensing performed by the sensing devices.

Light detection and ranging (LIDAR) device may be used to detect the surroundings of the unmanned autonomous vehicle, and anti-shake technology may be used to improve the detection quality of LIDAR device.

SUMMARY

One or more example embodiments of the present disclosure provide a driving apparatus and a driving controlling method, which are capable of enabling driving without recognizing flat ground viewed from a ramp or a ramp viewed from flat ground as an obstacle.

However, embodiments of the present disclosure are not restricted to those set forth herein. The above and other embodiments of the present disclosure will become more apparent to one of ordinary skill in the art to which the present disclosure pertains by referencing the detailed description of the present disclosure given below.

According to an aspect of an example embodiment, there is provided a driving apparatus including a body, a surroundings detection unit detecting surroundings of the body, the surrounding detection unit including a light detection and ranging (LIDAR) device and a camera, and at least one processor configured to control the driving of the body based on a detection result from the surroundings detection unit, wherein the at least one processor is further configured to detect a ramp and flat ground that are present on a driving path based on an image obtained by the camera, and determine the detected ramp or the detected flat ground from a detection result from the LIDAR device as a non-obstacle.

The LIDAR device may be configured to generate a three-dimensional (3D) map of the surroundings of the body based on emitting light to the surroundings of the body and receiving reflected light from an object.

The at least one processor may be further configured to detect the ramp and the flat ground that are present on the driving path based on a moving direction of a feature pattern included in the image obtained by the camera in an image area.

Based on the feature pattern ascending in the image area when the body is moving on flat ground, the at least one processor may be configured to determine that the body is approaching an ascending ramp.

Based on the feature pattern descending in the image area when the body is moving on flat ground, the at least one processor may be further configured to determined that the body is entering an ascending ramp.

Based on the feature pattern ascending in the image area when the body is moving along an ascending ramp, the at least one processor may be further configured to determine that the body is entering flat ground connected to an upper part of the ascending ramp.

Based on the feature pattern descending in the image area when the body is moving on flat ground, the at least one processor may be further configured to determine that the body is approaching a descending ramp.

Based on the feature pattern ascending in the image area when the body is moving on flat ground, the at least one processor may be further configured to determine that the body is entering a descending ramp.

Based on the feature pattern descending in the image area when the body is moving along a descending ramp, the at least one processor may be further configured to determine that the body is approaching flat ground connected to a lower part of the descending ramp.

Based on the feature pattern not being recognized from the image area, the at least one processor may be further configured to apply a first weight to the detection result from the LIDAR device and a second weight a detection result from the camera, and detect the ramp and the flat ground that are present on the driving path based on the first weight-applied detection result from the LIDAR device and the second weight-applied detection result from the camera.

Based on the body is moving along a ramp, the at least one processor may be further configured to lower the first weight applied to the detection result from the LIDAR device and raise the second weight applied to the detection result from the camera, compared to when the body is entering the ramp.

The feature pattern may include at least one of a horizon, a vanishing point, and a lower boundary line, and the lower boundary line may include a boundary between a lower part of a descending ramp and flat ground.

According to another aspect of an example embodiment, there is provided a driving controlling method for controlling the driving of a driving apparatus, the driving controlling method including detecting surroundings of a body of the driving apparatus, and controlling the driving of the body based on a result of the detecting the surroundings of the body, wherein the detecting the surroundings of the body is performed by a light detection and ranging (LIDAR) device and a camera, and wherein the controlling the driving of the body further includes detecting a ramp and flat ground that are present on a driving path of the body based on an image obtained by the camera, and determining the detected ramp or the detected flat ground from a detection result from the LIDAR device as a non-obstacle.

The detecting the surroundings of the body may include generating, by the LIDAR device, a three-dimensional (3D) map of the surroundings of the body by emitting light to the surroundings of the body and receiving reflected light from an object.

The controlling the driving of the body may further include detecting the ramp and the flat ground that are present on the driving path based on a moving direction of a feature pattern included in the image obtained by the camera, in an image area.

The controlling the driving of the body may further include determining that the body is approaching an ascending ramp based on the feature pattern ascending in the image area when the body is moving on flat ground, determining that the body is entering an ascending ramp based on the feature pattern descending in the image area when the body is moving on flat ground, and determining that the body is entering flat ground connected to an upper part of an ascending ramp based on the feature pattern ascending in the image area when the body is moving along an ascending ramp.

The controlling the driving of the body may further include determining that the body is approaching a descending ramp based on the feature pattern descending in the image area when the body is moving on flat ground, determining that the body is entering a descending ramp based on the feature pattern ascending in the image area when the body is moving on flat ground, and determining that the body is approaching flat ground connected to a lower part of a descending ramp based on the feature pattern descending in the image area when the body is moving along a descending ramp.

The controlling the driving of the body may further include, based on the feature pattern not being recognized from the image area, applying a first weight to the detection result from the LIDAR device and a second weight to a detection result from the camera, and detecting the ramp and the flat ground that are present on the driving path based on the first weight-applied detection result from the LIDAR device and the second weight-applied detection result from the camera.

The controlling the driving of the body may further include, based on the body is moving along a ramp, lowering the first weight applied to the detection result from the LIDAR device and raising the second weight applied to the detection result from the camera, compared to when the body is entering the ramp.

The feature pattern may include at least one of a horizon, a vanishing point, and a lower boundary line, and the lower boundary line may include a boundary between a lower part of a descending ramp and flat ground.

BRIEF DESCRIPTION OF THE DRAWINGS

The above and/or other embodiments and features of the present disclosure will become more apparent by describing in detail example embodiments thereof with reference to the attached drawings, in which.

DETAILED DESCRIPTION

Figure 1:
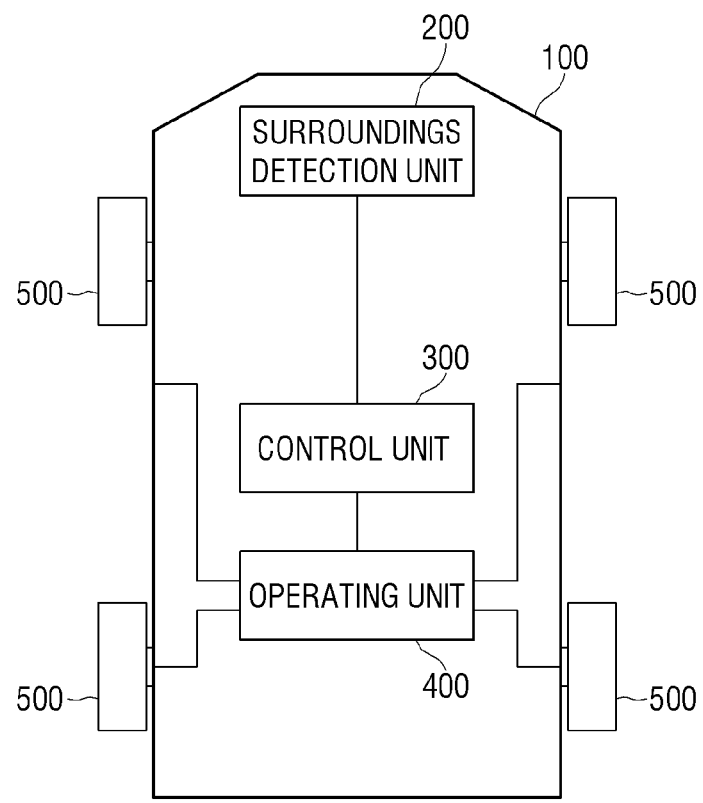
FIG. 1 illustrates a driving apparatus according to an example embodiment.

Hereinafter, example embodiments will be described in detail with reference to the accompanying drawings. Advantages and features of the example embodiments, and a method of achieving them will be apparent with reference to the example embodiments described below in detail together with the accompanying drawings. However, embodiments are not limited to the example embodiments described below, but may be implemented in various different forms, and these example embodiments are only provided to inform the scope of the present disclosure to those of ordinary skill in the technical field. The present disclosure is only defined by the scope of the claims. The same reference numerals refer to the same components throughout the specification.

Unless otherwise defined, all terms (including technical and scientific terms) used in the present disclosure may be used as meanings that can be commonly understood by those of ordinary skill in the art. In addition, terms defined in a commonly used dictionary are not interpreted ideally or excessively unless explicitly defined specifically.

Figure 2:
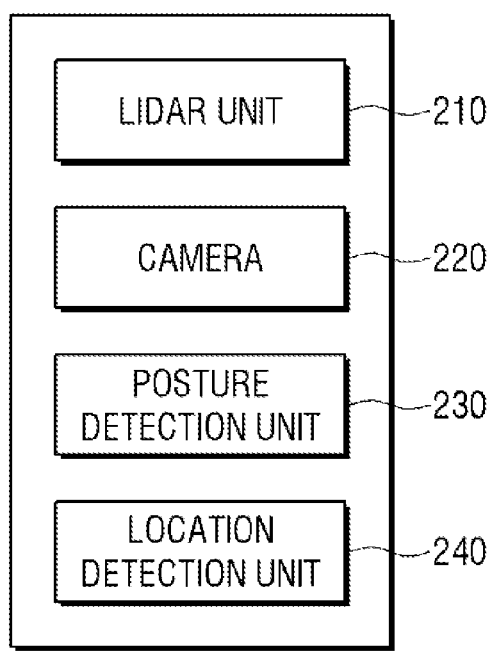
FIG. 2 is a block diagram of a surroundings detection unit 200 of FIG. 1 according to an example embodiment.

FIG. 1 illustrates a driving apparatus according to an example embodiment, and FIG. 2 is a block diagram of a surroundings detection unit 200 of FIG. 1.

Referring to FIG. 1, a driving apparatus 10 includes a body 100, a surroundings detection unit 200, a control unit 300, an operating unit 400, and a driving unit 500.

The body 100 may form the exterior of the driving apparatus 10. The surroundings detection unit 200, the control unit 300, the operating unit 400, and the driving unit 500 may be provided inside or outside the body 100.

The surroundings detection unit 200 may detect the surroundings of the body 100. The surroundings detection unit 200 may detect the driving direction of the driving apparatus 10.

Referring to FIG. 2, the surroundings detection unit 200 may include a light detection and ranging (LIDAR) unit 210, a camera 220, a posture detection unit 230, and a location detection unit 240.

The LIDAR unit 210 may be a LIDAR device configured to create a three-dimensional (3D) map of the surroundings of the body 100 by emitting light to the surroundings of the body 100 and receiving reflected light from objects in the surroundings of the body 100. The objects in the surroundings of the body 100 can be detected based on the 3D map created by the LIDAR unit 210.

The camera 220 may capture and generate an image of the surroundings of the body 100. The image generated by the camera 220 may be a still image or a moving image. The posture detection unit 230 may detect the posture of the body 100. For example, the posture detection unit 230 may detect the posture of the body 100 with respect to the surface of the sea. The posture detection unit 230 may include at least one of a gravity sensor, an acceleration sensor, and a gyro sensor. The location detection unit 240 may determine the location of the body 100. For example, the location detection unit 240 may include a global positioning system (GPS) receiver. In this example, the location detection unit 240 may determine the absolute coordinates of the body 100 on the ground based on received satellite signals.

Referring again to FIG. 1, the control unit 300 may control the driving of the body 100 based on the detection result from the surroundings detection unit 200. For example, the control unit 300 may control the body 100, based on the detection result from the surroundings detection unit 200, to continue or stop traveling to avoid any obstacle.

Specifically, the control unit 300 may detect a ramp and flat ground that are present on a driving path based on the image generated by the camera 220 and may exclude a detected ramp and detected flat ground as non-obstacles. When the driving apparatus 10 approaches a ramp while being driven on flat ground or approaches flat ground while driving on a ramp, the ramp or the flat ground may be recognized as an obstacle by the LIDAR unit 210. As a result, the driving apparatus 10 may stop traveling.

To prevent this type of malfunction, the control unit 300 may recognize a ramp and flat ground by analyzing the image generated by the camera 220. Then, if the driving apparatus 10 approaches a ramp while being driven on flat ground or approaches flat ground while driving on a ramp, the control unit 300 may determine the ramp or the flat ground detected by the LIDAR unit 210 as a non-obstacle and exclude the ramp or the flat ground detected from being determined as an obstacle. As the ramp or the flat ground detected by the LIDAR unit 210 is excluded, the driving apparatus 10 may continue to travel even upon encountering and approaching the ramp or the flat ground.

The operating unit 400 may generate a driving force for driving the body 100. The driving force from the operating unit 400 may be transmitted to the driving unit 500, and the body 100 may be driven in accordance with the operation of the driving unit 500. For example, the operating unit 400 may include a motor, and the driving unit 500 may be provided in the form of wheels, tracks, legs, or propellers. For example, the driving apparatus 10 may be provided in the form of a vehicle or a robot.

Figure 3:
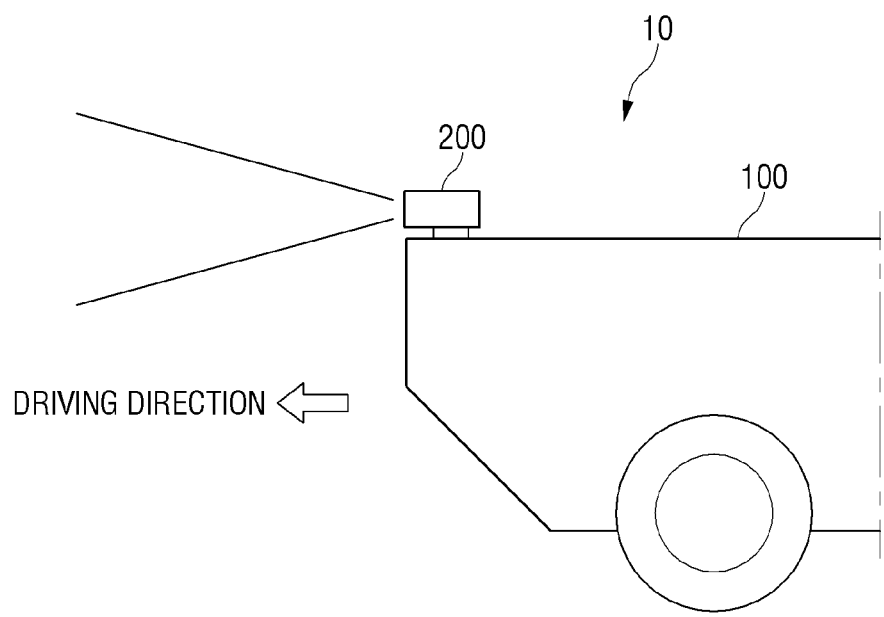
FIG. 3 illustrates the sensing direction of the surroundings detection unit 200 in FIG. 1 according to an example embodiment.
Figure 4:
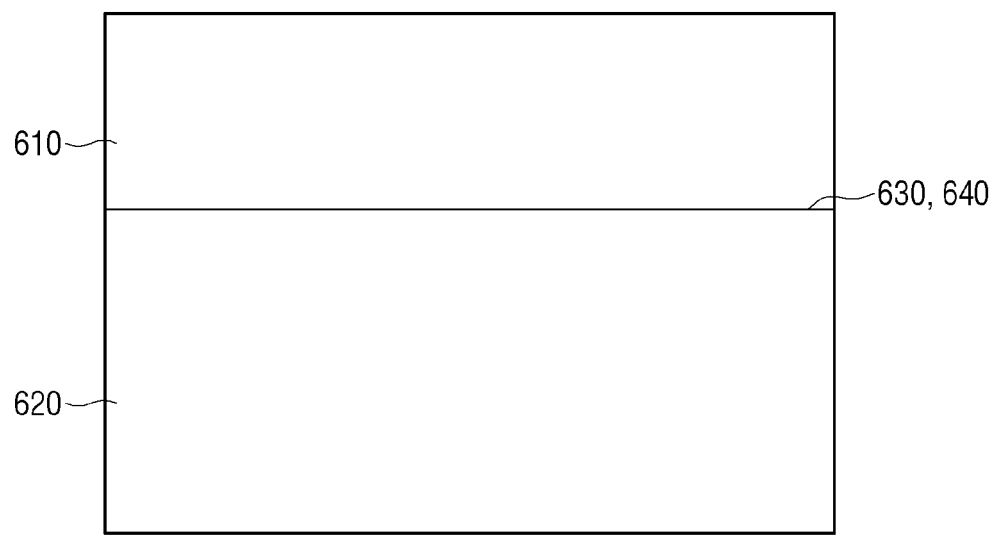
FIGS. 4 and 5 illustrate images generated by the camera 220 in FIG. 1 according to an example embodiment.
Figure 5:
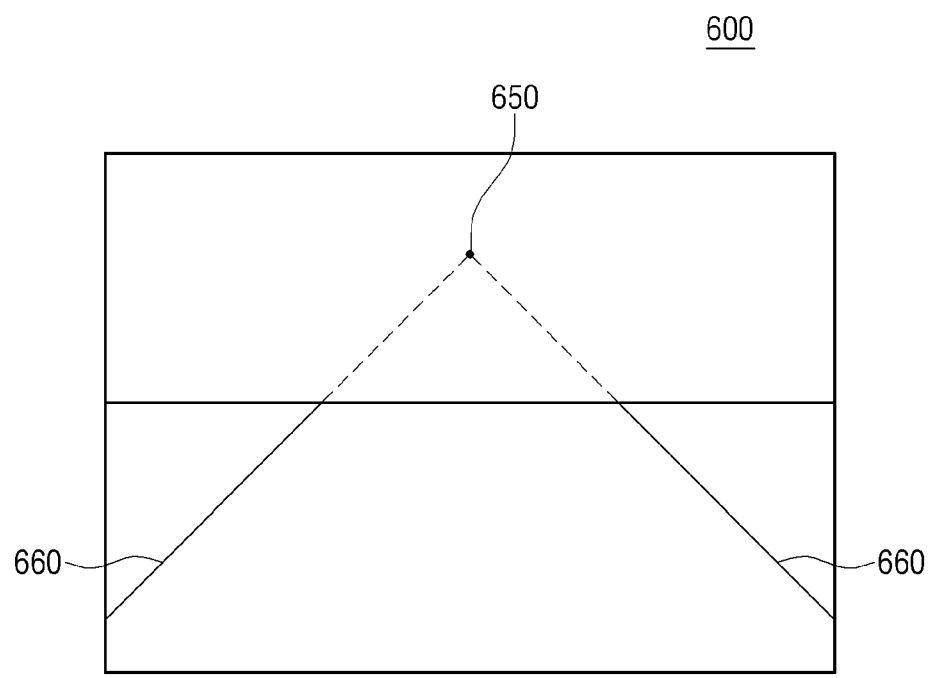
Figure 6:
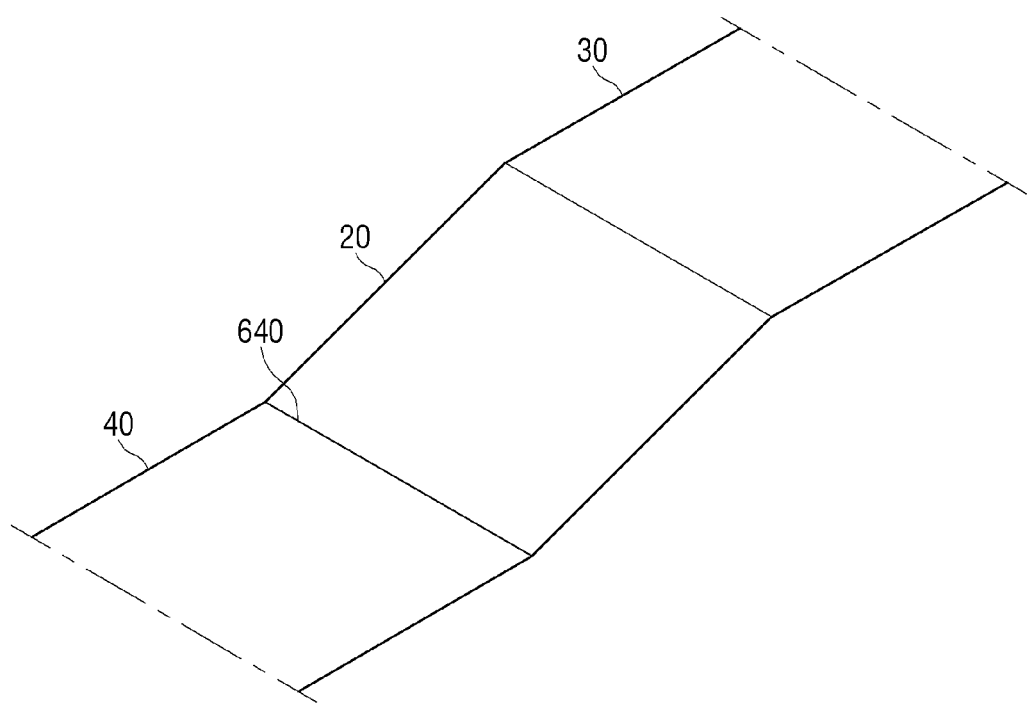
FIG. 6 illustrates a lower boundary line according to an example embodiment.

FIG. 3 illustrates the sensing direction of the surroundings detection unit 200 in FIG. 1 according to an example embodiment, FIGS. 4 and 5 illustrate images generated by the camera 220 in FIG. 1 according to example embodiments, and FIG. 6 illustrates a lower boundary line.

Referring to FIG. 3, the surroundings detection unit 200 may detect the driving direction of the body 100. For example, the LIDAR unit 210 and the camera 220 of the surroundings detection unit 200 may detect the driving direction of the body 100.

The detection result from the LIDAR unit 210 and the detection result from the camera 220 may be transmitted to the control unit 300, and the control unit 300 may control the driving of the body 100 based on the detection result from the LIDAR unit 210 and the detection result from the camera 220.

The control unit 300 may detect a ramp and flat ground that are present on the driving path with reference to the moving direction of a feature pattern in an image area generated by the camera 220. The feature pattern may include at least one of a horizon, a vanishing point, and a lower boundary line.

Referring to FIG. 4, a horizon 630 or a lower boundary line 640 may be a line that horizontally divides an image area 600 of an image generated by the camera 220.

For example, when the image area 600 is divided into upper and lower areas 610 and 620, the control unit 300 may determine the boundary between the upper and lower areas 610 and 620 as the horizon 630 or the lower boundary line 640 by analyzing the image generated by the camera 220.

In addition, for example, the control unit 300 may analyze the upper and lower areas 610 and 620 of the image area 600 and may determine what the upper and lower areas 610 and 620 are. For example, when the upper and lower areas 610 and 620 of the image area 600 are determined as being the sky and the ground, respectively, the control unit 300 may determine the boundary between the upper and lower areas 610 and 620 as the horizon 630. For example, when the upper and lower areas 610 and 620 of the image area 600 are determined as both being the ground, the control unit 300 may determine the boundary between the upper and lower areas 610 and 620 as the lower boundary line 640.

The lower boundary line 640 may be the boundary between a descending ramp and flat ground. Referring to FIG. 6, a ramp 20 may be connected to flat grounds 30 and 40. For example, upper and lower parts of the ramp 20 may be connected to the flat grounds 30 and 40, respectively. The flat grounds 30 and 40, to which the upper and lower parts of the ramp 20 are respectively connected, will hereinafter be referred to as upper flat ground 30 and lower flat ground 40.

The driving apparatus 10 may move along the ramp 20. The altitude of the driving apparatus 20 may increase or decrease in accordance with the inclination direction of the ramp 20. The ramp 20 will hereinafter be referred to as an ascending ramp 20 if the altitude of the driving apparatus 10 increases while the driving apparatus 10 is being driven on the ramp 20 or as a descending ramp 20 if the altitude of the driving apparatus 10 decreases while the driving apparatus 10 is being driven on the ramp 20.

The lower boundary line 640 may include a boundary line representing the boundary between the lower part of the ramp 20 and the lower flat ground 40. The image generated by the camera 220 may include the descending ramp 20 and the lower flat ground 40 when the driving apparatus 10 is being driven on the descending ramp 20. Referring to FIGS. 4 and 6, in a case where both the upper and lower areas 610 and 620 of the image area 600 are determined as both being the ground and being separated from each other, the control unit 300 may determine that the boundary between the upper and lower areas 610 and 620 as the lower boundary line 640.

Referring to FIG. 5, the vanishing point 650 refers to a point where extensions of boundary lines 660 from different patterns included in the image area 600 meet.

The image area 600 may include a plurality of boundary lines 660, which are arranged at an inclination with respect to each other. The boundary lines 660 may be lines that separate both boundaries of the driving path from other areas.

Referring again to FIG. 3, the control unit 300 may detect the ramp 20 and the flat grounds 30 and 40 that are present on the driving path with reference to the moving direction of the feature pattern included in the image generated by the camera 220, in the image area 600. For example, the control unit 300 may detect the ramp 20 and the flat grounds 30 and 40 based on whether the feature pattern is ascending or descending in the image area 600. The detection of the ramp 20 and the flat grounds 30 and 40 based on the moving direction of the feature pattern will be described later with reference to FIGS. 9 through 24.

Figure 7:
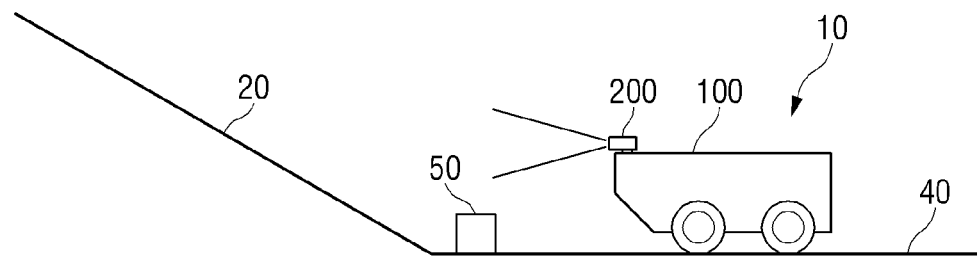
FIGS. 7 and 8 illustrate a method to exclude a ramp as a non-obstacle according to an example embodiment.
Figure 8:
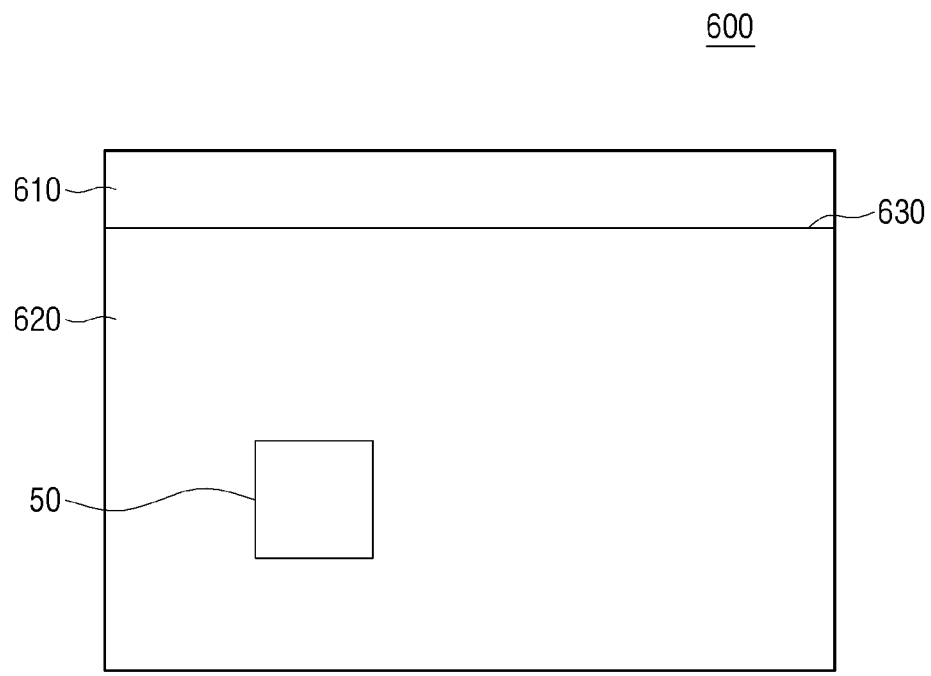

FIGS. 7 and 8 illustrate a method to exclude a ramp as a non-obstacle according to an example embodiment.

Referring to FIG. 7, the driving apparatus 10 may approach a ramp 20 while being driven.

As the driving apparatus 10 approaches the ramp 20, the ramp 20 may be recognized by the LIDAR unit 210. In addition, an object present on the driving path of the driving apparatus 10 may be recognized by the LIDAR unit 210.

Referring to FIG. 8, a horizon 630 and the object 50 may be included in an image generated by the camera 220.

The control unit 300 may determine that a lower area 620 of an image area 600 below the horizon 630 is the ramp 20, based on the moving direction of the horizon 630. Also, the control unit 300 may determine that the object 50 is a separate entity from the ramp 20 by analyzing the image generated by the camera 220. Accordingly, the control unit 300 may exclude the ramp 20, detected by the LIDAR unit 210, as a non-obstacle and may determine the object 50 as an obstacle. For example, in a case where there exists the ramp 20 on the driving path of the driving apparatus 10, the control unit 20 may determine whether the ramp 20 is an obstacle by referencing both the detection result from the camera 220 and the detection result from the LIDAR unit 210. Therefore, any emergency stop of the driving apparatus 10 that may be caused due to misrecognition of the ramp 20 as an obstacle may be prevented.

FIGS. 9 through 12 illustrate how the driving apparatus 10 moves along a driving path including an ascending ramp according to an example embodiment, and FIGS. 13 through 16 illustrate images captured by the camera 220 when the driving apparatus 10 moves along a driving path including an ascending ramp according to an example embodiment.

Referring to FIGS. 9 through 12, the driving apparatus 10 may encounter an ascending ramp 20 while being driven on the lower flat ground 40, may enter the ascending ramp 20, and may enter the upper flat ground 30, to which the ascending ramp 20 is connected.

Figure 9:
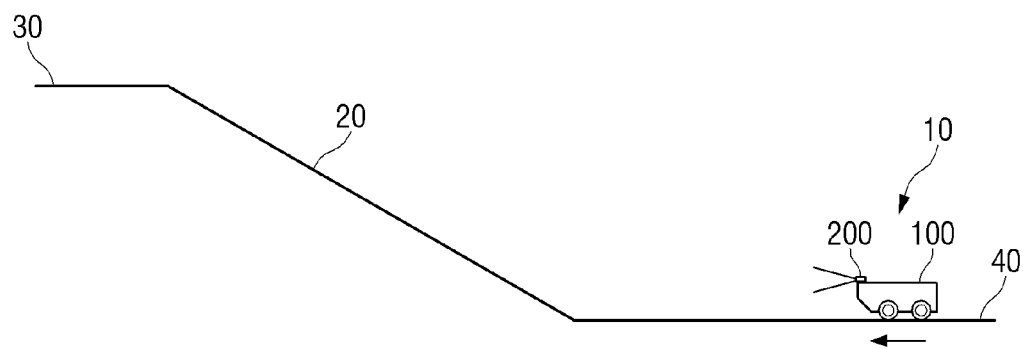
FIGS. 9, 10, 11, and 12 illustrate how the driving apparatus 10 in FIG. 1 moves along a driving path including an ascending ramp according to an example embodiment.
Figure 13:
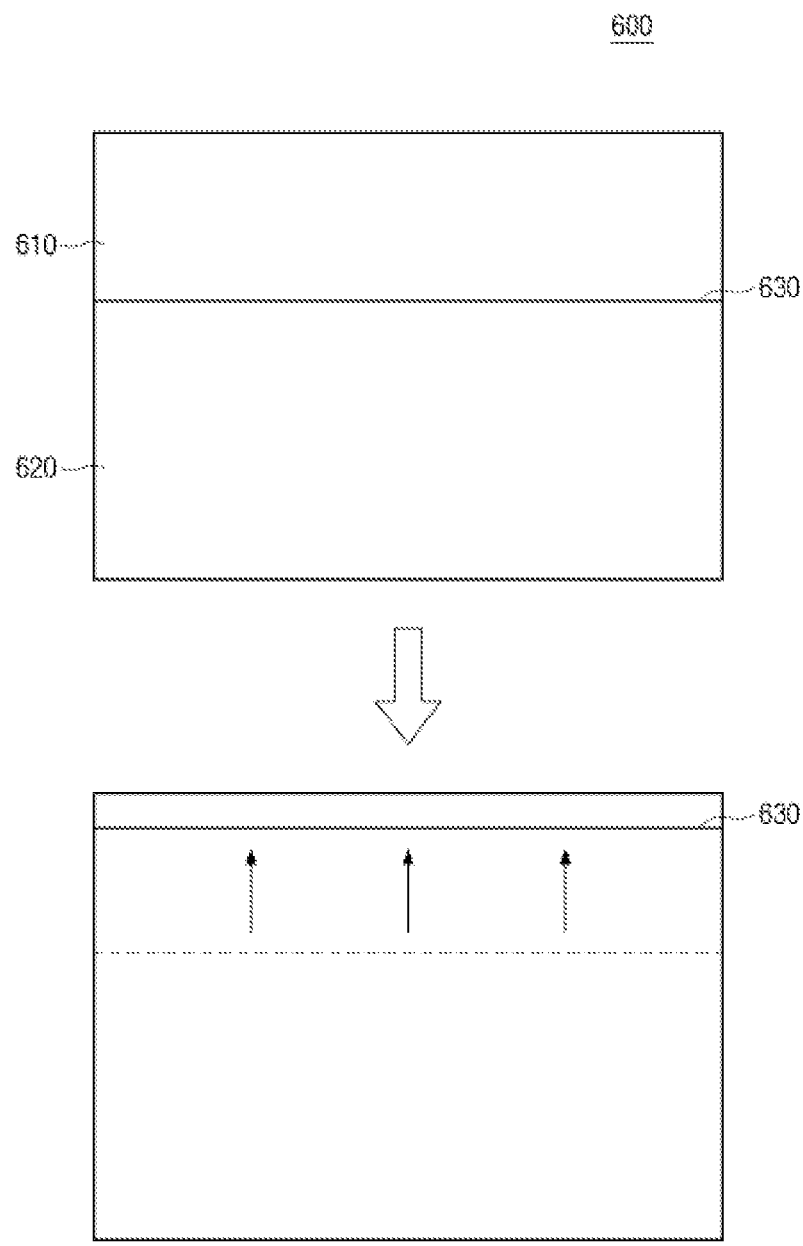
FIGS. 13, 14, 15, and 16 illustrate images captured by the camera 220 in FIG. 1 when the driving apparatus 10 moves along a driving path including an ascending ramp according to an example embodiment.

Referring to FIGS. 9 and 13, the control unit 300 may determine the body 100 is approaching the ascending ramp 20 if a feature pattern, for example, a horizon 630, ascends when the body 100 is moving on the lower flat ground 40.

As upper and lower areas 610 and 620 of an image area 600 of an image captured by the camera 220 may be the sky and the ground, respectively, at a distance from the ascending ramp 20, the horizon 630 may be recognized. As the body 100 approaches the ascending ramp 20, the horizon 630 may ascend in the image area 600. The control unit 300 may determine that the body 100 is approaching the ascending ramp 20 if the ascending speed (per unit hour) of the horizon 630 is faster than a predefined level.

Figure 10:
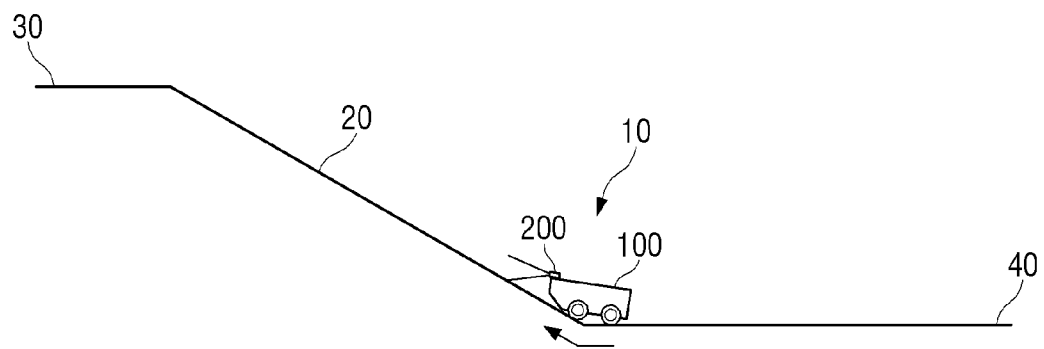
Figure 14:
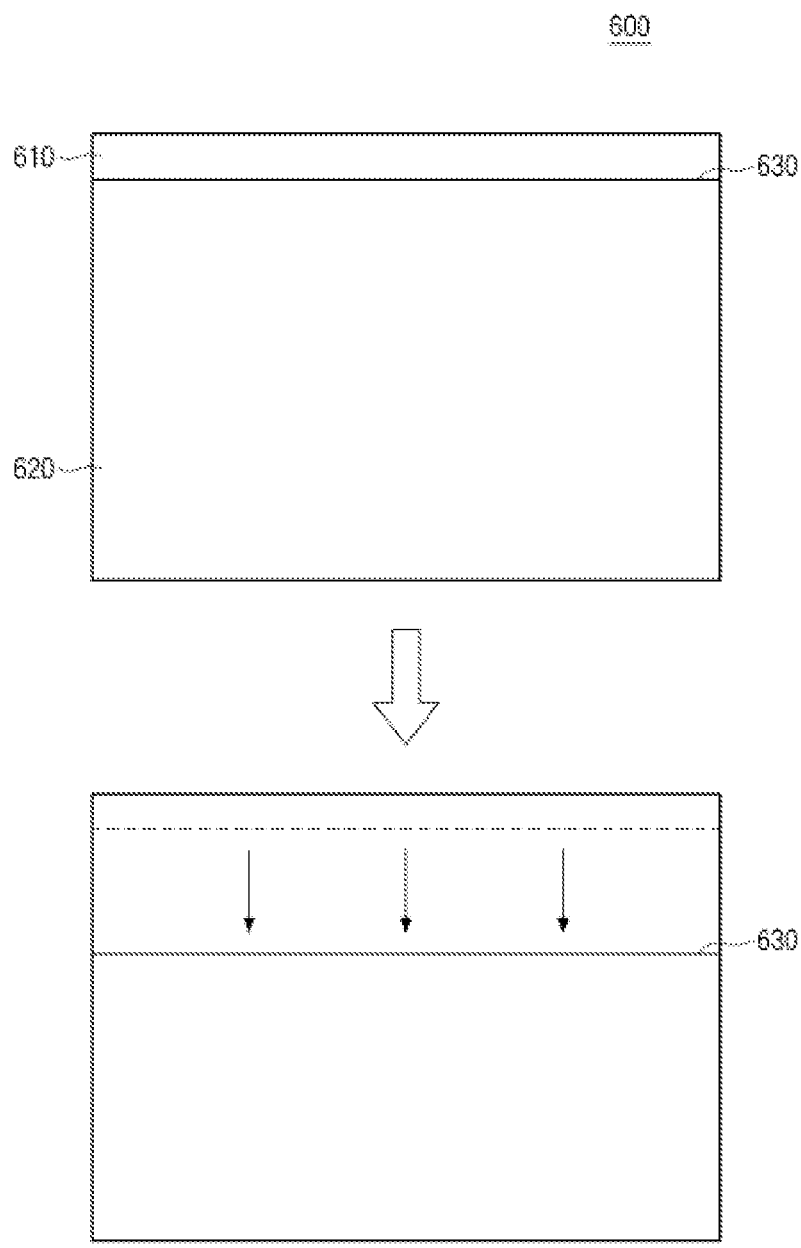

Referring to FIGS. 10 and 14, the control unit 300 may determine that the body 100 is entering the ascending ramp 20 if the horizon 630 descends in the image area 600 when the body 100 is moving on the lower flat ground 40.

If the body 100 enters the ascending ramp 20, the posture of the body 100 is changed so that the sensing direction of the surroundings detection unit 200 faces the upper side of the ascending ramp 20. In this case, the horizon 630 may descend in the image area 600, and the control unit 300 may determine that the body 100 is entering the ascending ramp 20 if the descending speed (per unit hour) of the horizon 630 is faster than a predefined level.

Figure 11:
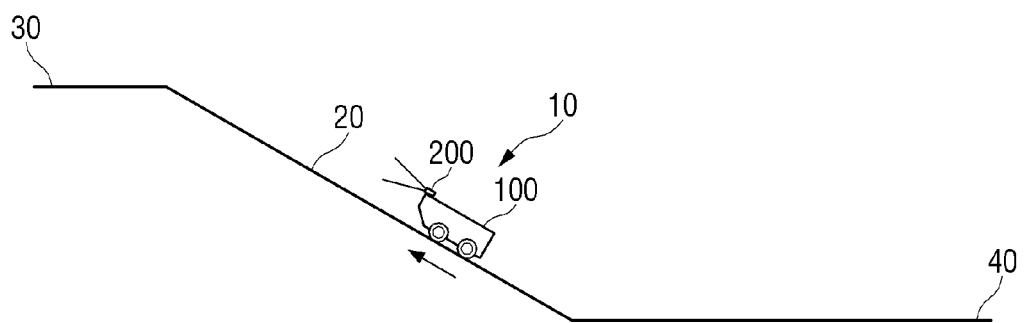
Figure 15:
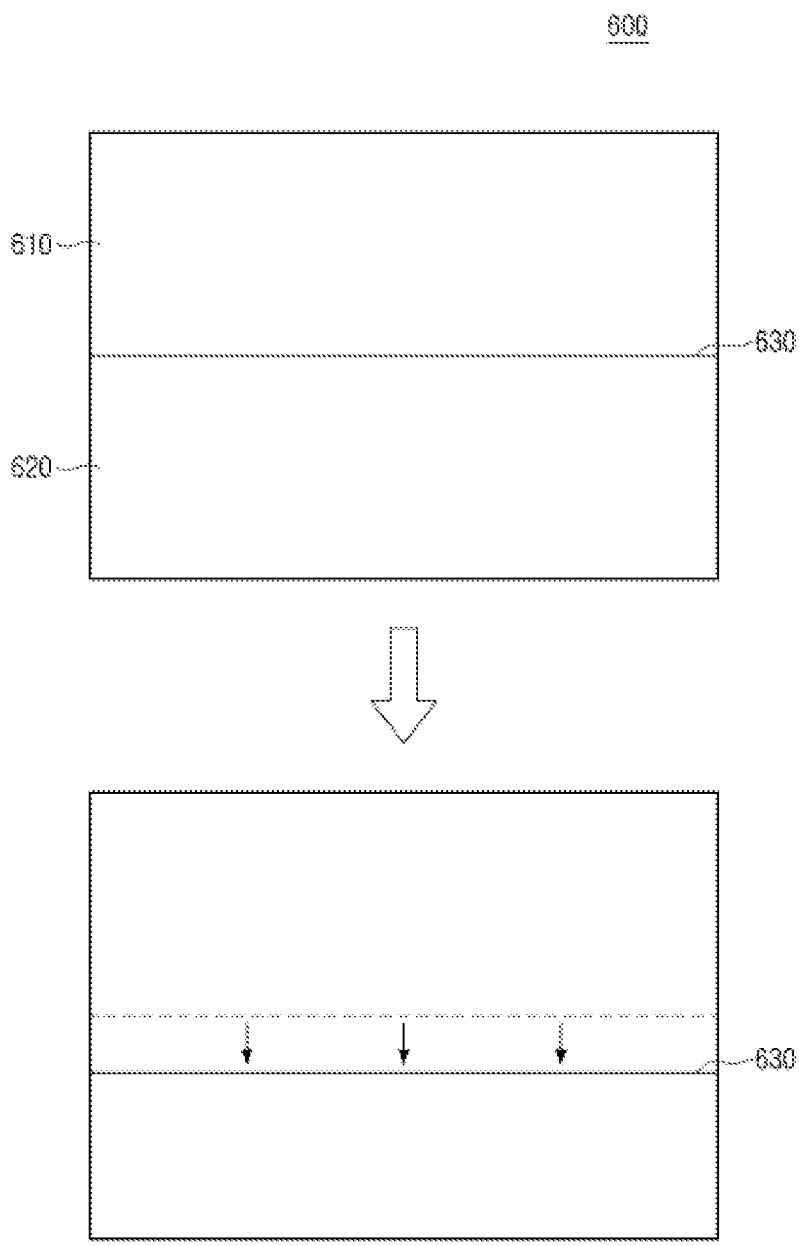

Referring to FIGS. 11 and 15, the control unit 300 may determine that the body 100 is being driven on the ascending ramp 20 based on the descending speed of the horizon 630 in the image area 600 when the body 100 is moving along the ascending ramp 20.

When the body 100 is moving along the ascending ramp 20, the horizon 630 may descend in the image area 600. The distance by which the horizon 630 descends per unit hour may be relatively small when the body 100 is moving along the ascending ramp 20. For example, the descending speed of the horizon 630 may be faster when the body 100 is entering the ascending ramp 20 than when the body 100 is moving along the ascending ramp 20.

As the body 100 moves along the ascending ramp 20, the horizon 630 may continue to descend in the image area 600.

Figure 12:
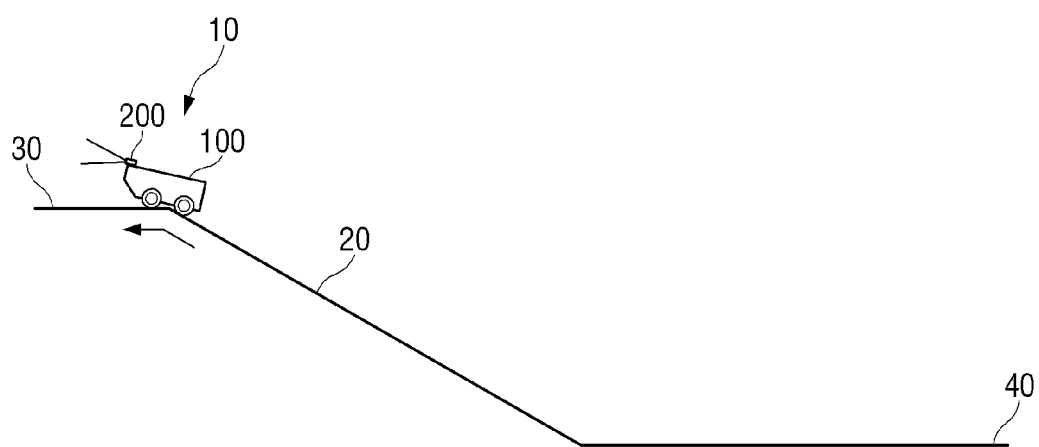
Figure 16:
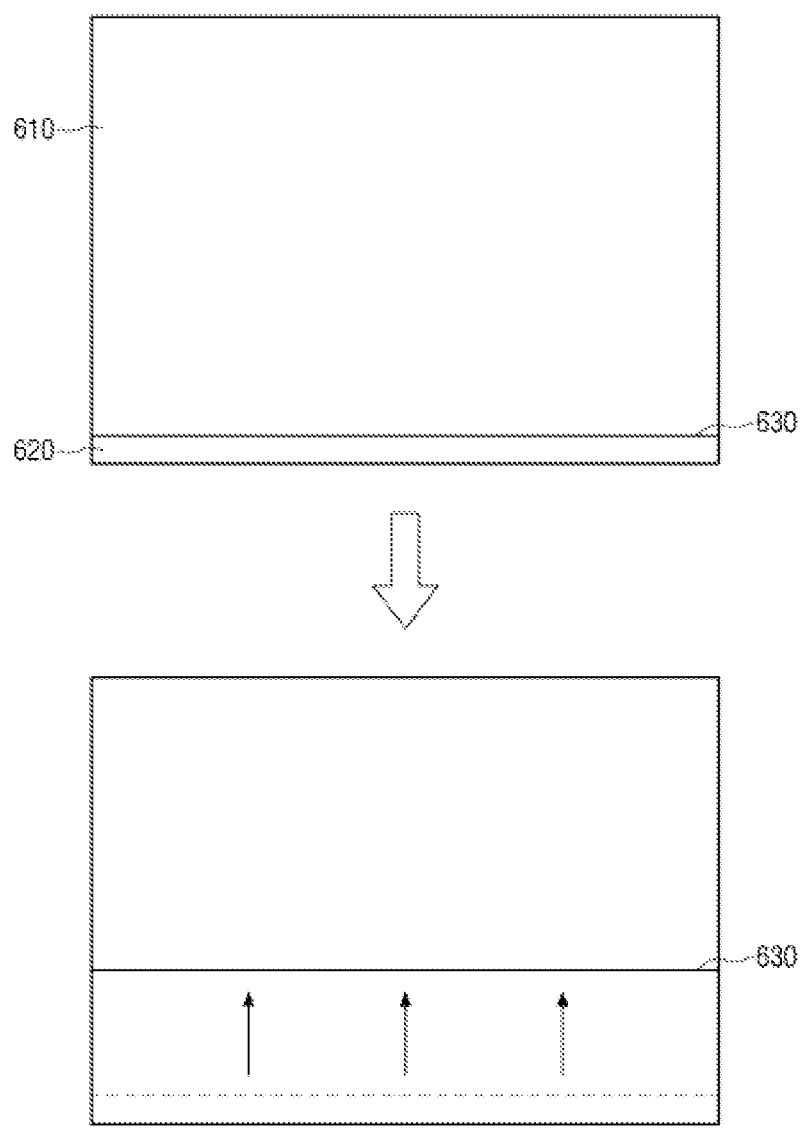

Referring to FIGS. 12 and 16, if the horizon 630 ascends in the image area 600 when the body 100 is moving along the ascending ramp 20, the control unit 300 may determine that the body 100 is entering the upper flat ground 30, which is connected to the upper part of the ascending ramp 20.

As the body 100 enters the upper flat ground 30, which is connected to the upper part of the ascending ramp 20, the posture of the body 100 is changed so that the sensing direction of the surroundings detection unit 200 faces forward of the upper flat ground 30. In this case, the horizon 630 may ascend in the image area 600, and the control unit 300 may determine that the body 100 is entering the upper flat ground 30 if the ascending speed (per unit area) of the horizon 630 is faster than a predefined level.

In this manner, the control unit 300 may determine whether the body 100 is approaching, or is moving along, the ascending ramp 20, and/or is entering the upper flat ground 30, and may exclude the ascending ramp 20, which is detected by the LIDAR unit 210, as a non-obstacle.

FIGS. 17 through 20 illustrate how the driving apparatus 10 moves along a driving path including a descending ramp according to an example embodiment, and FIGS. 21 through 24 illustrate images captured by the camera 220 while the driving apparatus 10 is moving along a driving path including a descending ramp according to an example embodiment.

Referring to FIGS. 17 through 20, the driving apparatus 10 may encounter a descending ramp 20 while being driven on the upper flat ground 30, may enter the descending ramp 20, may move along the descending ramp 20, and may enter the lower flat ground 40, to which the descending ramp 20 is connected.

Figure 17:
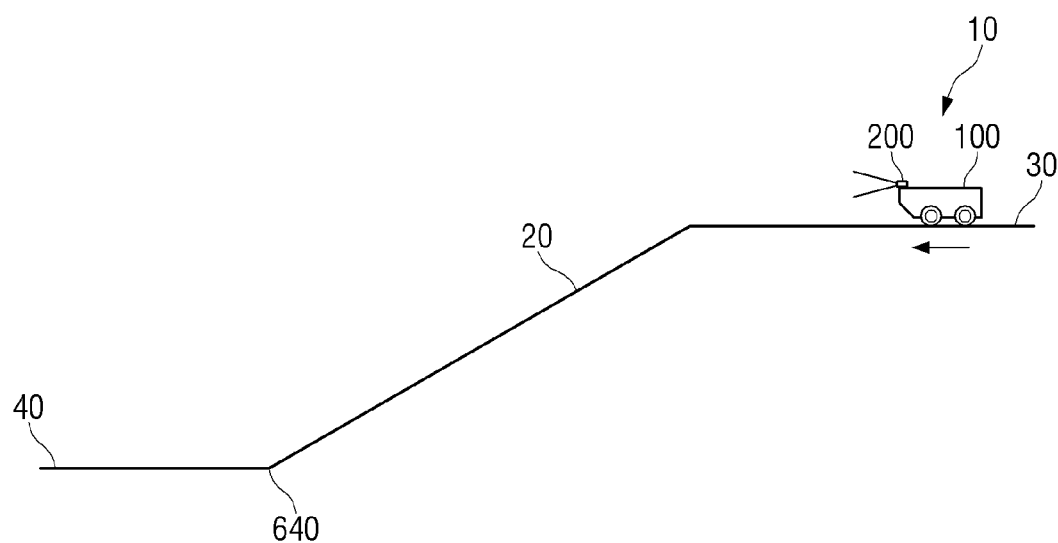
FIGS. 17, 18, 19, and 20 illustrate how the driving apparatus 10 in FIG. 1 moves along a driving path including a descending ramp according to an example embodiment.
Figure 21:
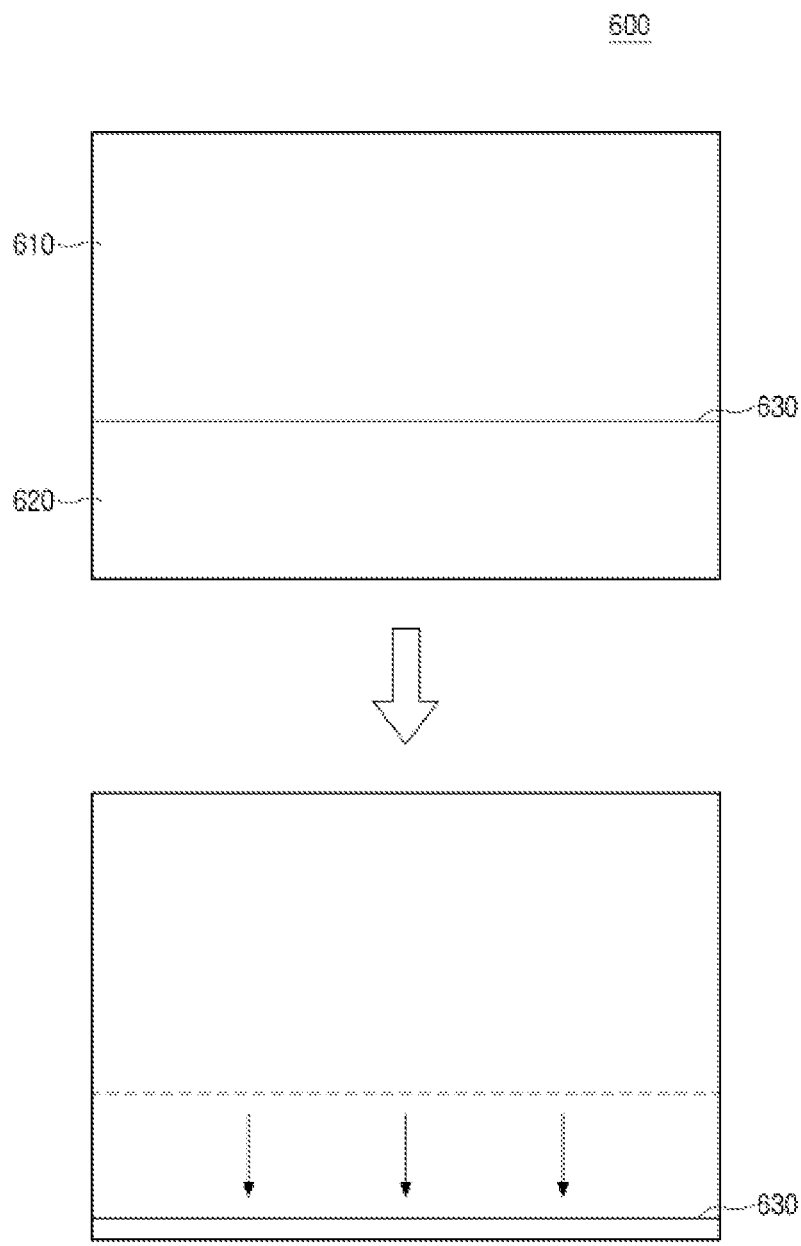
FIGS. 21, 22, 23, and 24 illustrate images captured by the camera 220 in FIG. 1 while the driving apparatus 10 is moving along a driving path including a descending ramp according to an example embodiment.

Referring to FIGS. 17 and 21, the control unit 300 may determine that the body 100 is approaching the descending ramp 20 if a feature pattern in an image area 600, for example, a horizon 630, descends when the body 100 is moving on the upper flat ground 30.

As upper and lower areas 610 and 620 of the image area 600 are the sky and the ground, respectively, at a distance from the descending ramp 20, the horizon 630 can be recognized. As the body 100 approaches the descending ramp 20, the horizon 630 may descend in the image area 600. The control unit 300 may determine that the body 100 is approaching the descending ramp 20 if the descending speed (per unit hour) of the horizon 630 is faster than a predefined level.

Figure 18:
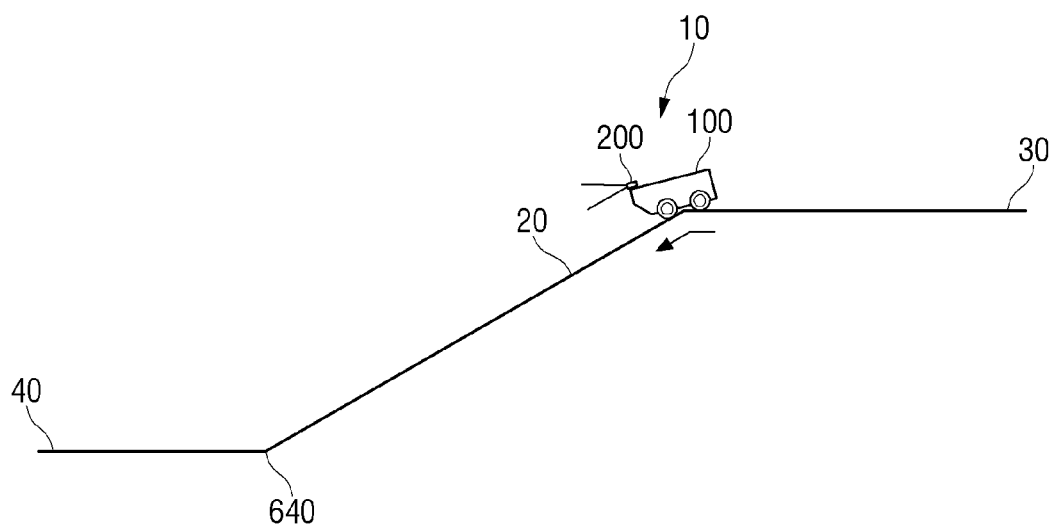
Figure 22:
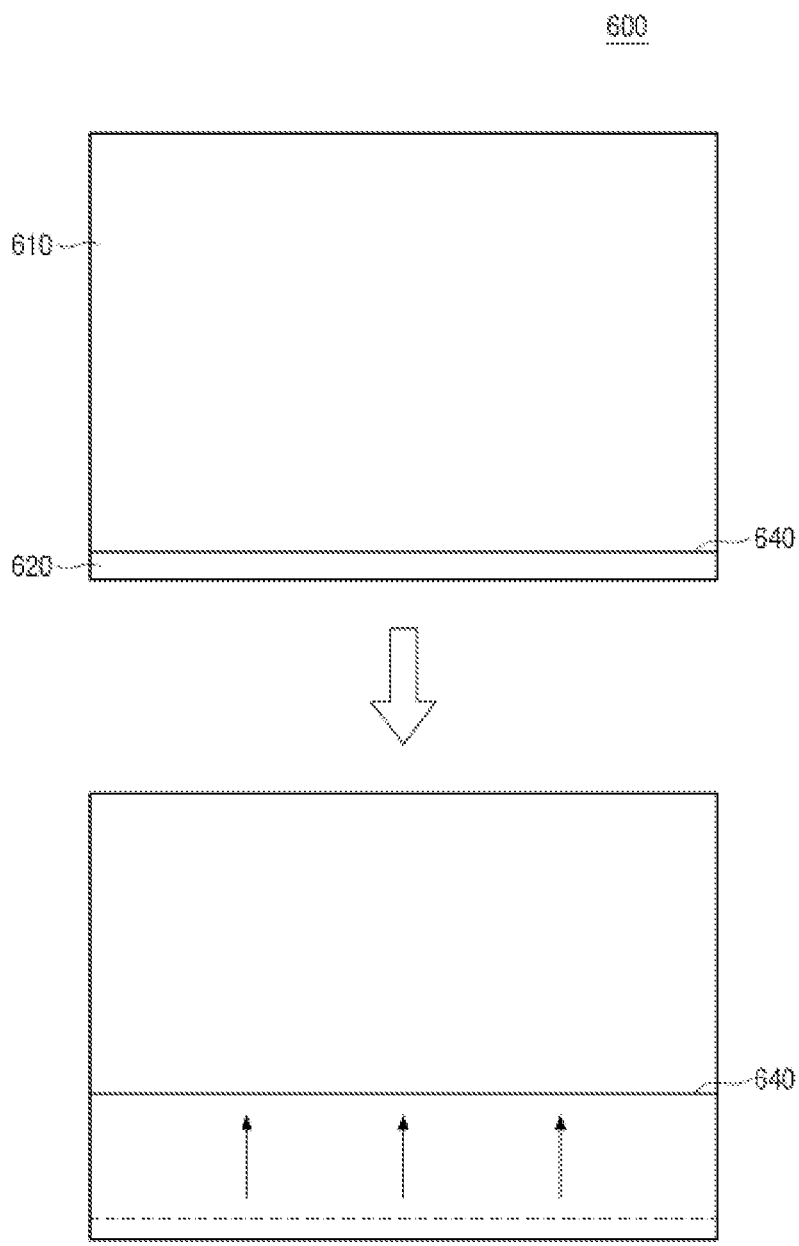

Referring to FIGS. 18 and 22, if another feature pattern in the image area 600, for example, a lower boundary line 640, ascends when the body 100 is moving along the descending ramp 20, the control unit 300 may determine that the body 100 is entering the descending ramp 20.

As the body 100 enters the descending ramp 20, the posture of the body 100 is changed so that the sensing direction of the surroundings detection unit 200 faces downward of the descending ramp 20. In this case, the lower boundary line 640 may be recognized by the camera 220, and the lower boundary line 640 may ascend in the image area 600. The control unit 300 may determine that the body 100 is entering the descending ramp 20 if the ascending speed (per unit area) of the lower boundary line 640 is faster than a predefined level.

Figure 19:
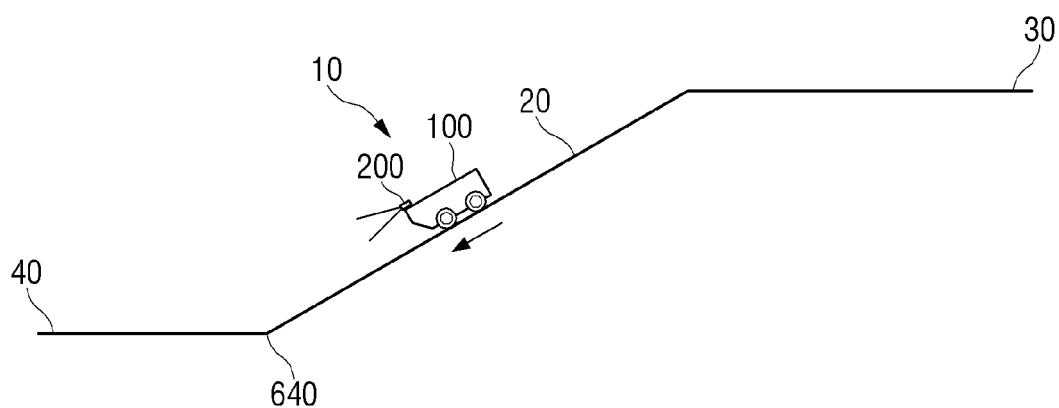
Figure 23:
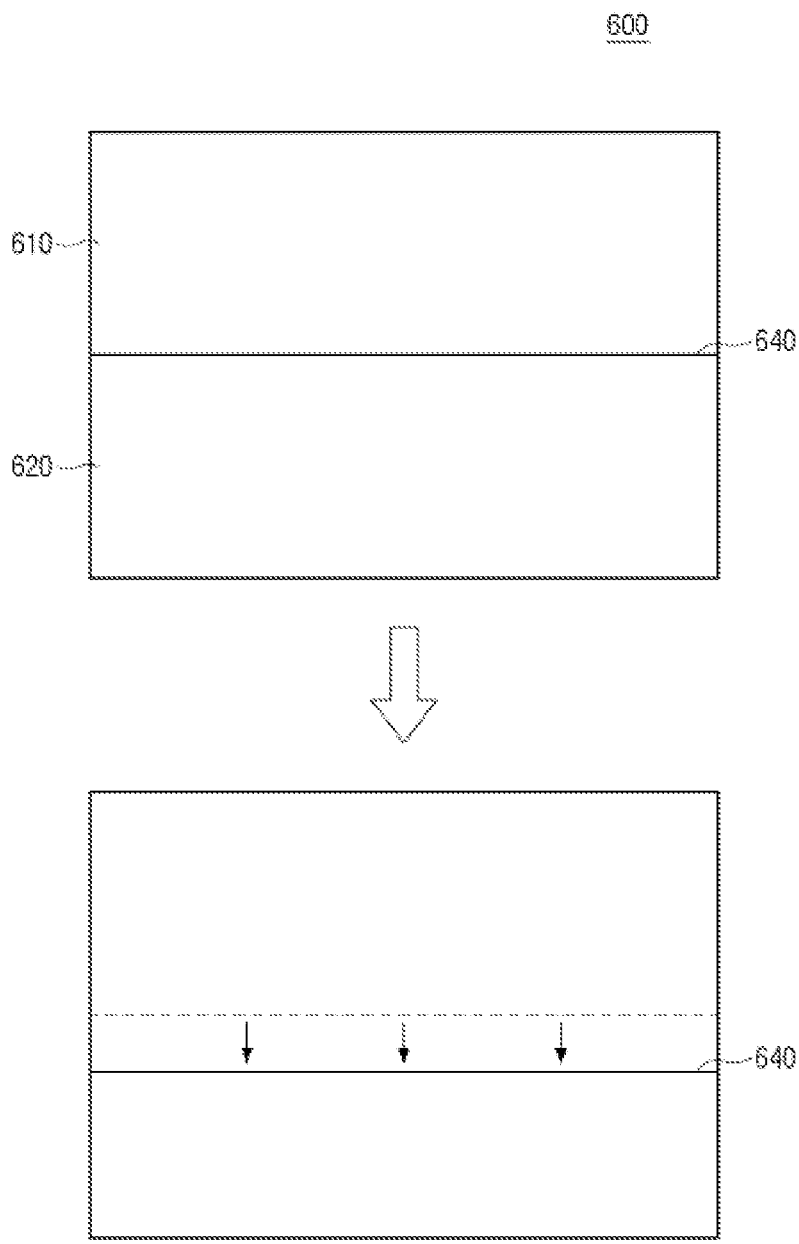

Referring to FIGS. 19 and 23, the control unit 300 may determine that the body 100 is being driven on the descending ramp 20 based on the descending speed of the lower boundary line 640 in the image area 600 when the body 100 is moving along the descending ramp 20.

When the body 100 is moving along the descending ramp 20, the lower boundary line 640 may descend in the image area 600. The distance by which the lower boundary line 640 descends per unit hour may be relatively small when the body 100 is moving along the descending ramp 20. For example, the descending speed of the horizon 630 may be faster when the body 100 is entering the descending ramp 20 than when the body 100 is moving along the descending ramp 20.

As the body 100 moves along the descending ramp 20, the lower boundary line 640 may continue to descend in the image area 600.

Figure 20:
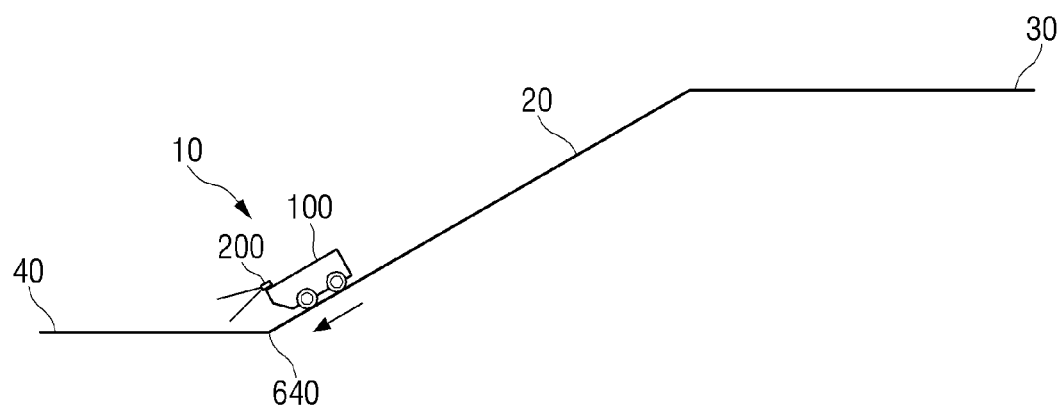
Figure 24:
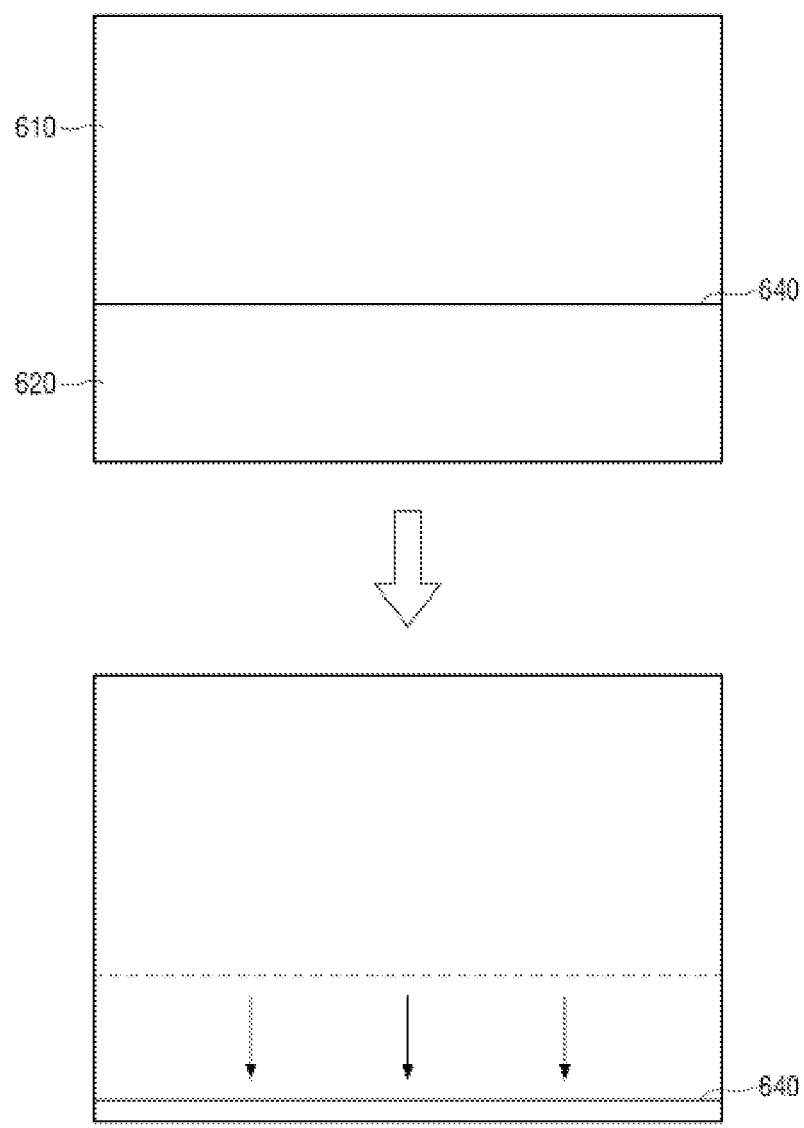

Referring to FIGS. 20 and 24, the control unit 300 may determine that the body 100 is approaching a lower flat ground 40, to which the lower part of the descending ramp 20 is connected, if the lower boundary line 640 descends in the image area 600 when the body 100 is moving along the descending ramp 20.

When the body 100 approaches the lower flat ground 40, which is connected to the lower part of the descending ramp 20, the lower boundary line 640 may descend in the image area 600. The control unit 300 may determine that the body 100 is approaching the lower flat ground 40 if the descending speed (per unit area) of the lower boundary line 640 is faster than a predefined level.

In this manner, the control unit 300 may determine whether the body 100 approaches, or is moving along, the descending ramp 20 and/or approaches the lower flat ground 40, and may exclude the descending ramp 20, which is detected by the LIDAR unit 210, as a non-obstacle.

An example where the lower boundary line 640 is recognized from an image captured by the camera 220 has been described above, but the lower boundary line 640 may not be able to be recognized depending on the environment in which the camera 220 captures an image and the states of the descending ramp 20 and the lower flat ground 40 in the image captured by the camera 220. The control unit 300 may control the driving of the body 100 in different manners depending on whether the lower boundary line 640 is properly recognized.

Figure 25:
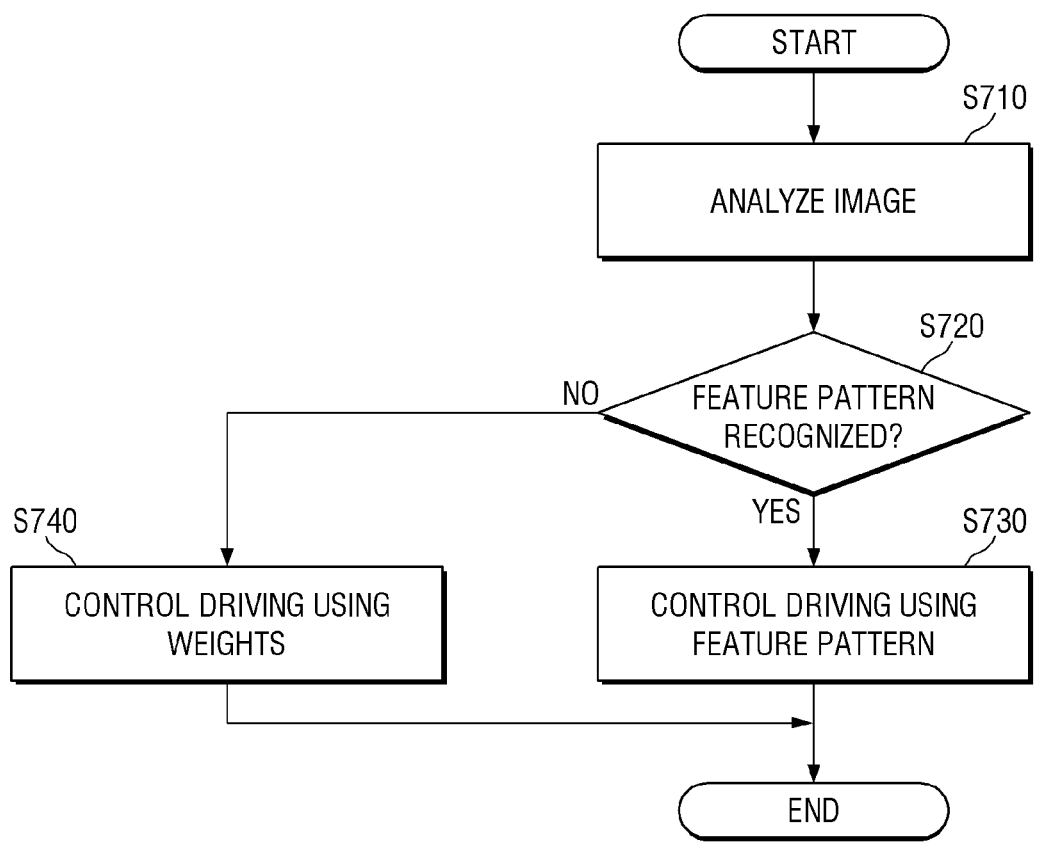
FIG. 25 is a flowchart illustrating the operation of the control unit 300 in FIG. 1 according to an example embodiment.
Figure 26:
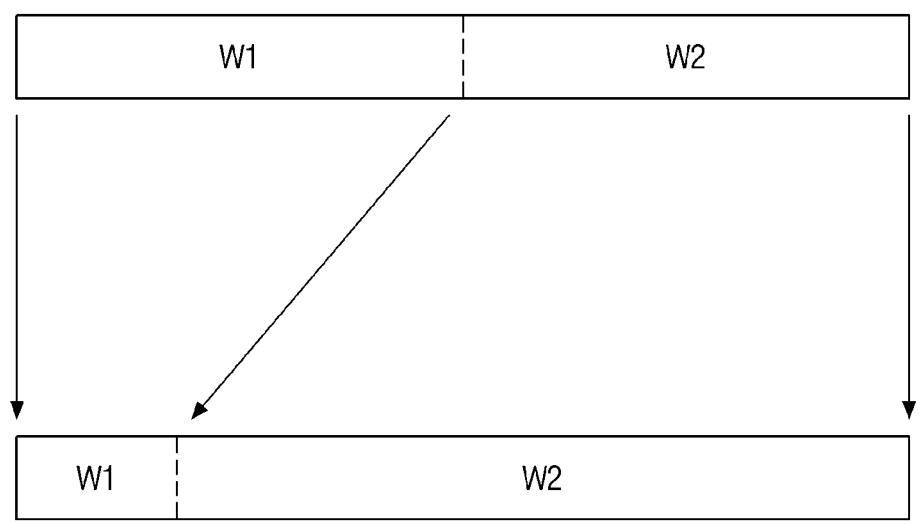
FIG. 26 illustrates changes in weights applied to detection results of the LiDAR unit 210 and the camera 220 according to an example embodiment.

FIG. 25 is a flowchart illustrating the operation of the control unit 300 according to an example embodiment. FIG. 26 illustrates changes in weights applied to detection results of the LIDAR unit 210 and the camera 220 according to an example embodiment.

Referring to FIG. 25, the control unit 300 may analyze an image received from the camera 220 (S710) to control the driving of the body 100.

The control unit 300 may determine whether any feature pattern is recognizable from the received image (S720) based on the result of the analysis performed in S710. If there exists a feature pattern recognizable from the received image, the control unit 300 may control the driving of the body 100 based on the feature pattern (S730) according to example embodiments described above.

On the contrary, if no feature pattern is recognizable from the received image, the control unit 300 may control the driving of the body 100 based on weights (S740). Specifically, the control unit 300 may apply weights to the detection result from the LIDAR unit 210 and the detection result from the camera 220, and may detect a ramp and flat ground that are present on the driving path of the body 100. For example, a ramp 20 and upper and lower flat grounds 30 and 40 may be detected, based on the weight-applied detection results from the LIDAR unit 210 and the camera 220. For example, when a lower boundary line 640 is not recognizable when the body 100 is being driven on a descending ramp 20, the control unit 300 may control the driving of the body 100 using weights.

Referring to FIG. 26, as the body 100 is moving along the ramp 20, the control unit 300 may lower a first weight W1 applied to the detection result from the LIDAR unit 210 and raise a second weight W2 applied to the detection result from the camera 220, as compared to when the body 100 is entering the ramp 20.

When the body 100 is being driven on the descending ramp 20, the lower boundary line 640 may not be recognized. In this case, as the body 100 moves along the descending ramp 20, the control unit 300 may lower the first weight W1 and raise the second weight W2. For example, the control unit 300 may set the first and second weights W1 and W2 to be the same when the body 100 is entering the descending ramp 20 and may then lower the first weight W1 and raise the second weight W2 as the body 100 is moving along the descending ramp 20. The control unit 300 may lower the first weight W1 and raise the second weight W2 based on the distance or the amount of time travelled by the body 100. For example, as the distance or the amount of time travelled by the body 100 increases, the first weight W1 may be reduced, and the second weight W2 may be raised. Alternatively, the control unit 300 may reduce the first weight W1 and raise the second weight W2 based on at least one of the detection result from the posture detection unit 230 and the detection result from the posture detection unit 240. For example, the control unit 300 may estimate the distance to the lower flat ground 40 based on at least one of the detection result from the posture detection unit 230 and the detection result from the location detection unit 240 and may reduce the first weight W1 and raise the second weight W2 based on the result of the estimation.

At an initial stage of the driving of the body 100 along the descending ramp 20, a determination may be made as to whether an object ahead of the body 100 is an obstacle by applying similar weights to the detection result from the LIDAR unit 210 and the detection result from the camera 220. At a later stage of the driving of the body 100 along the descending ramp 20, a determination may be made as to whether an object ahead of the body 100 is an obstacle by applying a greater weight to the detection result from the camera 220 than to the detection result from the LIDAR unit 210.

At an initial stage of the driving of the body 100 along the descending ramp 20, it may be less likely that the LIDAR unit 210 will perceive the lower flat ground 40 as an obstacle because the lower flat ground 40 is relatively distant from the body 100. Thus, the control unit 300 may set the reliability of the detection result from the LIDAR unit 210 high at an initial stage of the driving of the body 100 along the descending ramp 20. At a later stage of the driving of the body 100 along the descending ramp 20, it may be more likely that the LIDAR unit 210 will perceive the lower flat ground 40 as an obstacle because the lower flat ground 40 is relatively close to the body 100. Thus, the control unit 300 may set the reliability of the detection result from the LIDAR unit 210 low at a later stage of the driving of the body 100 along the descending ramp 20 compared to an initial stage. In this manner, even when a feature pattern is not recognizable, any emergency stop of the driving apparatus 10 that may be caused due to misrecognition of the ramp 20 or the upper or lower flat ground 30 or 40 as an obstacle may be prevented by controlling the body 100 using weights.

At least one of the components, elements, modules or units (collectively "components" in this paragraph) represented by a block in the drawings, such as the surrounding detection unit 200, control unit 300, and operating unit 400 in FIG. 1, and LiDAR unit 210, posture detection unit 230, and location detection unit 240 in FIG. 2 may be embodied as various numbers of hardware, software and/or firmware structures that execute respective functions described above, according to an example embodiment. For example, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Further, although a bus is not illustrated in the above block diagrams, communication between the components may be performed through the bus. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

Although the example embodiments have been described with reference to the above and the accompanying drawings, those of ordinary skill in the art will understand that the present disclosure may be implemented in other specific forms without changing the technical spirit or essential features. Therefore, it should be understood that the example embodiments described above are illustrative and non-limiting in all respects.

What is claimed is:

1. A driving apparatus comprising:
    a body;
    a surroundings detection unit detecting surroundings of the body, the surrounding detection unit comprising a light detection and ranging (LIDAR) device and a camera; and
    at least one processor configured to control the driving of the body based on a detection result from the surroundings detection unit,
    wherein the at least one processor is further configured to detect a ramp and a flat ground that are present on a driving path based on an image obtained by the camera, and determine the detected ramp or the detected flat ground from a detection result from the LIDAR device as a non-obstacle,
    wherein the at least one processor is further configured to detect the ramp and the flat ground that are present on the driving path based on a moving direction of a feature pattern included in the image obtained by the camera in an image area,
    wherein based on the feature pattern not being recognized from the image area, the at least one processor is further configured to apply a first weight to the detection result from the LIDAR device and a second weight a detection result from the camera, and detect the ramp and the flat ground that are present on the driving path based on the first weight-applied detection result from the LIDAR device and the second weight-applied detection result from the camera.

2. The driving apparatus of claim 1, wherein the LIDAR device is configured to generate a three-dimensional (3D) map of the surroundings of the body based on emitting light to the surroundings of the body and receiving reflected light from an object.

3. The driving apparatus of claim 1, wherein based on the feature pattern descending in the image area when the body is moving on the flat ground, the at least one processor is further configured to determined that the body is entering an ascending ramp.

4. The driving apparatus of claim 1, wherein based on the feature pattern ascending in the image area when the body is moving along an ascending ramp, the at least one processor is further configured to determine that the body is entering the flat ground connected to an upper part of the ascending ramp.

5. The driving apparatus of claim 1, wherein based on the feature pattern descending in the image area when the body is moving on the flat ground, the at least one processor is further configured to determine that the body is approaching a descending ramp.

6. The driving apparatus of claim 1, wherein based on the feature pattern ascending in the image area when the body is moving on the flat ground, the at least one processor is further configured to determine that the body is entering a descending ramp.

7. The driving apparatus of claim 1, wherein based on the feature pattern descending in the image area when the body is moving along a descending ramp, the at least one processor is further configured to determine that the body is approaching the flat ground connected to a lower part of the descending ramp.

8. The driving apparatus of claim 1, wherein based on the body moving along a ramp, the at least one processor is further configured to lower the first weight applied to the detection result from the LIDAR device and raise the second weight applied to the detection result from the camera, compared to when the body is entering the ramp.

9. The driving apparatus of claim 1, wherein the feature pattern includes at least one of a horizon, a vanishing point, and a lower boundary line, and
    wherein the lower boundary line includes a boundary between a lower part of a descending ramp and the flat ground.

10. A driving controlling method for controlling the driving of a driving apparatus, the driving controlling method comprising:

detecting surroundings of a body of the driving apparatus; and controlling the driving of the body based on a result of the detecting the surroundings of the body, wherein the detecting the surroundings of the body is performed by a light detection and ranging (LIDAR) device and a camera, and wherein the controlling the driving of the body further comprises detecting a ramp and a flat ground that are present on a driving path of the body based on an image obtained by the camera, and determining the detected ramp or the detected flat ground from a detection result from the LIDAR device as a non-obstacle that prevents an emergency stop of the driving apparatus, wherein the controlling the driving of the body further comprises detecting the ramp and the flat ground that are present on the driving path based on a moving direction of a feature pattern included in the image obtained by the camera in an image area, wherein the feature pattern includes at least one of a horizon, a vanishing point, and a lower boundary line, and wherein the controlling the driving of the body further comprises, based on the feature pattern not being recognized from the image area, applying a first weight to the detection result from the LIDAR device and a second weight to a detection result from the camera, and detecting the ramp and the flat ground that are present on the driving path based on the first weight-applied detection result from the LIDAR device and the second weight-applied detection result from the camera.

11. The driving controlling method of claim 10, wherein the detecting the surroundings of the body comprises generating, by the LIDAR device, a three-dimensional (3D) map of the surroundings of the body by emitting light to the surroundings of the body and receiving reflected light from an object.

12. The driving controlling method of claim 10, wherein the controlling the driving of the body further comprises:

determining that the body is approaching an ascending ramp based on the feature pattern ascending in the image area when the body is moving on the flat ground;

determining that the body is entering an ascending ramp based on the feature pattern descending in the image area when the body is moving on the flat ground; and determining that the body is entering the flat ground connected to an upper part of an ascending ramp based on the feature pattern ascending in the image area when the body is moving along an ascending ramp.

13. The driving controlling method of claim 10, wherein the controlling the driving of the body further comprises:

determining that the body is approaching a descending ramp based on the feature pattern descending in the image area when the body is moving on flat ground;

determining that the body is entering a descending ramp based on the feature pattern ascending in the image area when the body is moving on flat ground; and determining that the body is approaching flat ground connected to a lower part of a descending ramp based on the feature pattern descending in the image area when the body is moving along a descending ramp.

14. The driving controlling method of claim 10, wherein the controlling the driving of the body further comprises, based on the body is moving along a ramp, lowering the first weight applied to the detection result from the LIDAR device and raising the second weight applied to the detection result from the camera, compared to when the body is entering the ramp.

15. The driving controlling method of claim 10, wherein the lower boundary line includes a boundary between a lower part of a descending ramp and flat ground.

* * * * *